United States Patent
Gupta et al.

(10) Patent No.: US 11,367,120 B2
(45) Date of Patent: Jun. 21, 2022

(54) ADAPTIVE REWARDING FOR CONTENT PERSONALIZATION

(71) Applicant: Microsoft Technology Licensing, LLC, Redmond, WA (US)

(72) Inventors: Smrati Gupta, Seattle, WA (US); Lin Wang, Sammamish, WA (US); Anushka Gupta, Seattle, WA (US); Marco Rossi, Bellevue, WA (US); Jamin Conrad Barker, Snohomish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 100 days.

(21) Appl. No.: 16/834,815

(22) Filed: Mar. 30, 2020

(65) Prior Publication Data
US 2021/0142387 A1    May 13, 2021

Related U.S. Application Data

(60) Provisional application No. 62/932,884, filed on Nov. 8, 2019.

(51) Int. Cl.
*G06Q 30/06* (2012.01)
*G06F 16/9535* (2019.01)
(Continued)

(52) U.S. Cl.
CPC ......... *G06Q 30/0631* (2013.01); *A63F 13/61* (2014.09); *G06F 16/9535* (2019.01);
(Continued)

(58) Field of Classification Search
CPC ............. G06Q 30/0631; G06Q 20/123; G06Q 30/0271; G06Q 30/0255; G06Q 30/0217;
(Continued)

(56) References Cited

U.S. PATENT DOCUMENTS

| | | | |
|---|---|---|---|
| 2013/0085886 A1* | 4/2013 | Satish | G06Q 30/02 705/26.7 |
| 2013/0275418 A1* | 10/2013 | Kumar, V | G06F 16/24578 707/723 |

(Continued)

FOREIGN PATENT DOCUMENTS

| | | | | |
|---|---|---|---|---|
| WO | WO-02052374 A2 * | 7/2002 | | G06Q 30/02 |

OTHER PUBLICATIONS

Berry, et al., "How Personalizer Works", Retrieved from: https://docs.microsoft.com/en-us/azure/cognitive-services/personalizer/how-personalizer-works, Oct. 23, 2019, 9 Pages.

(Continued)

*Primary Examiner* — Alexandru Cirnu
(74) *Attorney, Agent, or Firm* — Rainier Patents, P.S.

(57) ABSTRACT

Business goals may be achieved using adaptive rewarding for the personalization of contents. In response to receiving user information, personalized contents for the user can be recommended using a reinforcement learning algorithm. In response to presenting the personalized content to the user, an action by the user selecting a particular content may be received. A reward value can be calculated for the action based on a reward function. The reward function can be based, at least in part, upon the action, the selected content, and/or the user. The reward function can be based upon one or more business goals, such as user engagement, monetization, and/or security. The calculated reward value can be provided to the reinforcement learning algorithm, which can be adapted based upon the reward value for future selection of personalized contents.

20 Claims, 5 Drawing Sheets

(51) Int. Cl.
*G06Q 20/12* (2012.01)
*G06Q 30/02* (2012.01)
*G06N 20/00* (2019.01)
*G06N 7/00* (2006.01)
*A63F 13/61* (2014.01)

(52) U.S. Cl.
CPC ............ *G06N 7/005* (2013.01); *G06N 20/00* (2019.01); *G06Q 20/123* (2013.01); *G06Q 30/0255* (2013.01); *G06Q 30/0271* (2013.01); *A63F 2300/5506* (2013.01)

(58) Field of Classification Search
CPC ... G06F 16/9535; G06F 16/435; G06N 20/00; G06N 7/005; G06N 3/006; A63F 13/61; A63F 2300/5506; G07F 17/0035
See application file for complete search history.

(56) References Cited

U.S. PATENT DOCUMENTS

| | | | | |
|---|---|---|---|---|
| 2014/0272847 A1* | 9/2014 | Grimes | .................... | G09B 7/08 434/236 |
| 2014/0358260 A1* | 12/2014 | Burgin | ............... | G06Q 30/0277 700/91 |
| 2016/0080643 A1* | 3/2016 | Kimura | .............. | H04N 5/23222 348/207.1 |
| 2016/0188725 A1* | 6/2016 | Wang | .................. | G06F 16/9535 707/734 |
| 2016/0313957 A1* | 10/2016 | Ebert | ...................... | H04W 4/02 |
| 2017/0061528 A1* | 3/2017 | Arora | .................... | G06F 16/958 |
| 2018/0342004 A1 | 11/2018 | Yom-tov et al. | | |
| 2018/0374138 A1 | 12/2018 | Mohamed et al. | | |
| 2019/0034976 A1* | 1/2019 | Hamedi | ............. | G06Q 30/0204 |
| 2020/0288204 A1* | 9/2020 | Duersch | ................ | G06N 20/00 |

OTHER PUBLICATIONS

Berry, et al., "Reward Scores Indicate Success of Personalization", Retrieved from: https://docs.microsoft.com/en-us/azure/cognitive-services/personalizer/concept-rewards, Oct. 24, 2019, 5 Pages.

"International Search Report and Written Opinion Issued in PCT Application No. PCT/US20/057270", dated Dec. 9, 2020, 11 Pages.

* cited by examiner

ADAPTIVE REWARDING FOR CONTENT PERSONALIZATION

BACKGROUND

Entities, such as businesses, desire to determine a set of contents to present to users to further their business goals, such as monetization, engagement, etc. For example, a game provider may need to pick from a portfolio of video game titles to display on a graphical user interface to a user that would maximize clicks, downloads, and/or playing time.

BRIEF DESCRIPTION OF THE DRAWINGS

The accompanying drawings illustrate implementations of the present concepts. Features of the illustrated implementations can be more readily understood by reference to the following descriptions in conjunction with the accompanying drawings. Like reference numbers in the various drawings are used where feasible to indicate like elements. The accompanying drawings are not necessarily drawn to scale. In the figures, the left-most digit of a reference number identifies the figure in which the reference number first appears. The use of similar reference numbers in different instances in the description and the figures may indicate similar or identical items.

DETAILED DESCRIPTION

Figure 1:
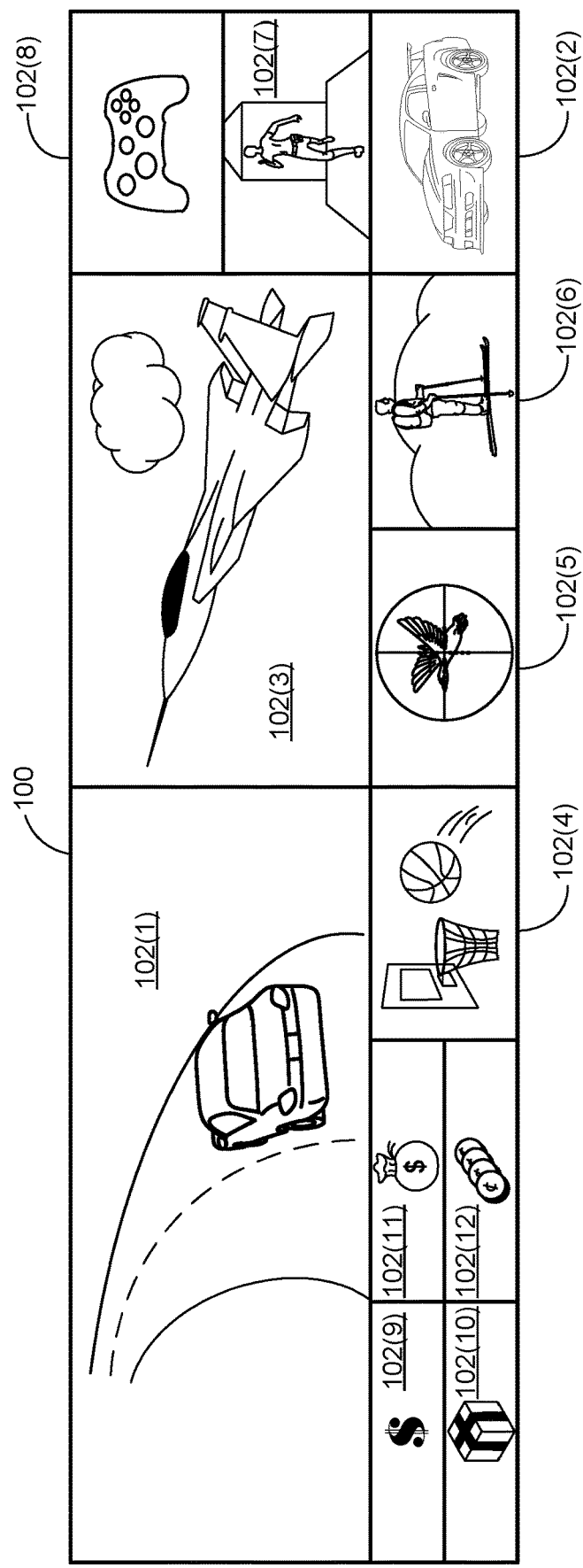
FIG. 1 illustrates an example graphical user interface, consistent with the present concepts.

Business entities who sell or promote contents to users face a challenge in selecting which specific contents among a large library of available contents to present to users. This challenge presents a technical problem of selecting a match between a user and contents that are likely to drive business goals, such as monetization, in scenarios with many restrictions, such as limited display screen real estate and limited user attention for the displayed contents. The present concepts provide technical solutions to the problem by using machine learning models to automatically select personalized contents for users. Moreover, an adaptive reward model is described that allows business entities to customize reward functions to specifically target certain business goals.

The present concepts relate to adaptively selecting personalized contents for users that help achieve certain goals. For instance, a machine learning model may use artificial intelligence techniques, such as reinforcement learning, to select a set of personalized contents based on feedback (e.g., rewards) received in response to user actions. The rewards assigned to the user actions, which are provided as feedback to the machine learning model, may be adapted to achieve specific business goals.

In one aspect, the objectives of the machine learning model may include aligning user actions with certain business goals, such as monetization, engagement, etc. This may be achieved by rewarding certain user actions that are more likely to further the business goals higher compared to other user actions that are less likely to help achieve those business goals.

In another aspect, rather than setting a static reward structure, the present concepts include adaptively updating the reward function on a regular basis through data-driven machine-learning technologies. That is, the reward formula for the user actions may be modified based on the latest set of data representing how the system is changing and has evolved (i.e., trends).

The present concepts pertain to the technical problem of personalizing contents available to users (e.g., games available for playing, movies available for watching, etc.) to maximize business goals. The technical features associated with solving this problem involve adaptively rewarding a machine learning model for improved personalization that results in desired user actions that help achieve the business goals. The technical solution may involve, receiving information regarding a user; recommending personalized contents for the user using a reinforcement learning algorithm; receiving an action of the user selecting a particular content from the personalized contents; calculating a reward for the action based on goals; providing the reward to the reinforcement learning algorithm; and adapting the reinforcement learning algorithm based at least on the reward. Accordingly, aspects of these technical features exhibit technical effects of more efficiently and effectively recommending personalized contents that further achieve certain goals.

FIG. 1 illustrates an example graphical user interface (GUI) 100, consistent with the present concepts. The GUI 100 may include one or more personalized contents 102. The GUI 100 may be presented in any digital platform, for example, on a web site viewed through a web browser, such as a search engine web site, a products or services marketplace, a review web site, etc.; in a store such as an app store, a movie store, a song store, a game store, etc.; in a virtual reality environment or an augmented reality environment; or in an application, such as a personal computer software or a mobile app. The GUI 100 may be displayed to a user using the entirety of a display screen available, or the GUI 100 may be displayed in a portion (e.g., on a side or at a corner) of the display screen. For example, while a user is playing a video game in the primary portion of a display screen, the GUI 100 that includes the personalized contents 102 may be displayed at the bottom portion of the display screen.

In the example implementation illustrated in FIG. 1, the personalized contents 102 may include a set of video game titles (including racing games 102(1) and 102(2), a flying game 102(3), a basketball game 102(4), a hunting game 102(5), a skiing game 102(6), and a jumping game 102(7)), a set of merchandise products (including a video game controller 102(8)), and a set of add-ons (e.g., in-game purchases 102(10), bonuses 102 (9), rewards 102(11), promotions 102(12), etc.). These personalized contents 102 are mere examples. Other titles, products, and types of contents are possible.

Although FIG. 1 depicts example contents related to the video gaming industry, the personalized contents 102, consistent with the present concepts, may include any content, such as apps, movies, videos, songs, search results, advertisements, products, services, merchandise, subscriptions, news, streaming contents, add-ons, channels, events, trials, discounts, demonstrations, etc. The present concepts can be used in any industry where personalizing the contents presented to users can help achieve certain goals.

In various implementations, the personalized contents 102 may be displayed in any arrangement, such as in rows, in columns, in a ring around the border of a display screen, or in a grid of any number of rows and columns. The sizes and locations of the personalized contents 102 may be homogeneous or heterogenous. For example, higher ranked personalized contents 102 may be displayed in larger sizes (taking up more real estate in the display screen), displayed closer to the center of the display screen to increase the chance of catching the user's attention, and/or displayed more prominently (e.g., brighter color, blinking, highlighted, flashing borders, etc.).

As explained above, the present concepts use adaptive rewarding to select the personalized contents 102 to display to users that will achieve and further certain targeted business goals. The selection and ranking of the personalized contents 102 will be discussed in reference to the following figures.

Figure 2:
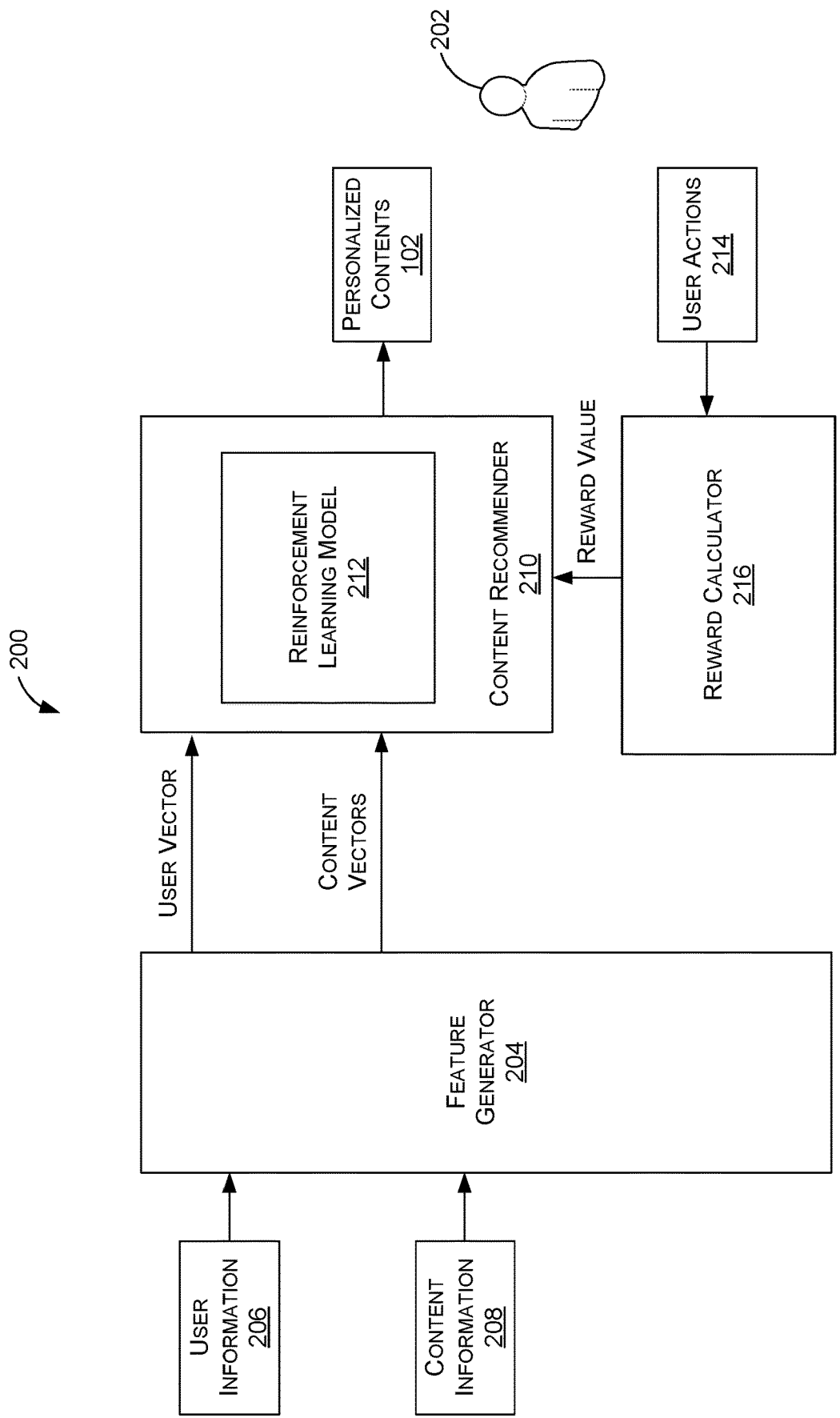
FIG. 2 illustrates an example content personalization system, consistent with the present concepts.

FIG. 2 illustrates an example functional block diagram of a content personalization system 200, consistent with the present concepts. The content personalization system 200 may implement adaptively rewarding for personalization of contents shown to a user 202. That is, the content personalization system 200 can apply business goals (e.g., monetization, user engagement, security, etc.) to calculate a reward that represents a degree of positive or negative reinforcement that can be utilized as feedback by a machine learning model to improve future selections and rankings of the personalized contents 102.

For purposes of explanation, the content personalization system 200 will be explained primarily in the context of video gaming. However, the content personalization system 200 can be utilized to recommend personalized contents 102 in any industry or for any types of contents, for example, movies, songs, books, personal goods, such as clothing, jewelry, and the like, in accordance with one or more business goals.

In some implementations, the content personalization system 200 may include a feature generator 204. The feature generator 204 may generate, for example, user vectors characterizing a plurality of characteristics of particular users. There are many different ways to describe or define a user as a set of features or signals. The characteristics of the user 202 may include fixed user features such as, a user identifier (e.g., user gaming identifier), age, gender, location, sexual orientation, race, language, and the like. The characteristics of the user 202 can also include dynamic user features, for example, purchase tendency, genre affinity, publisher affinity, capability affinity, social affinity, purchase history, interest history, wish list history, preferences, lifetime value, and the like. There may be a very high number of features or signals in a user vector. The feature generator 204 may generate a user vector that includes one or more user features for each user.

In one implementation, the user 202 can choose to provide user information 206 regarding the user 202 to the content personalization system 200. The feature generator 204 can use the user information 206 to generate a user vector. Alternatively or additionally, the user information 206 may be extracted or obtained from a user database. In some implementations, the user information 206 can exclude personally identifiable information or any other privacy information. In some implementations, the user information 206 can be maintained in a privacy preserving manner.

In some implementations, the feature generator 204 can generate content vectors for each of a plurality of contents (e.g., games) based on content information 208. The content information 208 may be manually provided or obtained from a database of contents. There are many different ways to describe or characterize content. A content vector can include a plurality of characteristics of a specific content (e.g., a particular game), for example, text about the content, metadata regarding the content, pricing information, toxicity, content rating, age group suitability, genre, publisher, social, the number of users, etc. The feature generator 204 can generate metrics for the various features related to content, such as an inclusiveness metric, a safety metric, a toxicity metric, etc. For example, the inclusiveness metric for a fighting game may range from 1 through 10, depending on the gender diversity and racial diversity of the characters in the fighting game.

The content personalization system 200 may include a content recommender 210. The content recommender 210 may generate a set of personalized contents 102 to be presented to the user 202. The user vector generated by the feature generator 204 in association with the user 202 and the content vectors generated by the feature generator 204 in association with the available contents may be utilized by the content recommender 210 to recommend the personalized contents 102 for the user 202. For example, the content recommender 210 may select 8 personalized contents 102 from a portfolio of 3,000+ available contents (e.g., game titles, game packs, add-ons, bundles, collections, etc.) that maximize user experience and business goals (e.g., that are likely to cause the user 202 to perform certain user actions that will contribute to achieving the business goals). In other words, the objective of the reinforcement learning model 212 may to be select personalized contents 102 that are likely to cause the user 202 towards certain behavior, such as clicking, purchasing, etc. The content recommender 210 may drive users to the contents of their liking. The content recommender 210 can select and suggest personalized contents 102 in a variety of ways using, for example, filtering or machine learning.

Consistent with the present concepts, the content recommender 210 may use artificial intelligence and machine learning models, such as a reinforcement learning model 212, to provide the personalized contents 102 that are personalized to the specific user 202. Accordingly, the reinforcement learning model 212 may employ a reinforcement learning algorithm to match the user 202 with a select set of personalized contents 102 that maximize rewards, as calculated by a reward calculator 216, which are fed back into the reinforcement learning model 212 as positive or negative reinforcement of the selection of the personalized contents 102.

In some implementations, the reinforcement learning model 212 may comprise a contextual bandit-based recommendation that matches a user with content to maximize impact. The reinforcement learning model 212 can receive information regarding the user 202 (e.g., via a user vector), information regarding the available contents (e.g., via content vectors), and/or information regarding context (e.g., dynamic user features such as purchase tendency, genre affinity, publisher affinity, capability affinity, and/or social affinity). In some implementations, the reinforcement learning model 212 may include inference models and/or may involve exploration strategies. The content recommender 210 may take risks and try random selection of contents to see how the user 202 reacts. Using the reinforcement learning model 212, the content recommender 210 can output top recommended personalized contents 102 selected from a pool of available contents for the particular user 202. In some implementations, the personalized contents 102 may include a ranking of all or some of the plurality of contents.

In some implementations, the personalized contents 102 output by the content recommender 210 can include information regarding the personalized contents 102, such as titles, channels, promotions, events, other products associated with the titles, etc., that are personalized for the user 202. Then, the personalized contents 102 may be provided to the user 202. For example, the personalized contents 102 can be presented to the user 202 on a display screen of an electronic device (e.g., using GUI 100).

In some implementations, the personalized contents 102 may include personalized presentation information, such as a ranking or an order of the contents, sizes or dimensions for the contents, locations or placement of the contents, arrangement of the contents (e.g., hierarchical placement of contents within a grid or other arrangements), highlighting or other emphasizing techniques associated with the contents, etc.

Referring back to FIG. 1, the personalized contents 102 may be presented to the user 202 using the GUI 100, for example. In this example illustration, the reinforcement learning model 212 may determine that, for the particular user 202, the racing game 102(1) is the highest ranked content, which should be displayed prominently using a large size and/or at a central location in the display screen. Other contents 102(2)-102(12) may be displayed relatively less prominently according to their rankings. Because the personalized contents 102 are specifically personalized to the user 202, the reinforcement learning model 212 may generate a completely different set of personalized contents for another user or the same or overlapping set of personalized contents with different rankings for another user. Accordingly, the GUI 100 illustrated in FIG. 1 is one example of how the personalized contents 102 for the particular user 202 may be presented. Other personalized contents and other arrangements are possible for other users.

In some implementations, the quantity of the personalized contents 102 may be fixed and predefined (e.g., based on the number of rows and columns in the GUI 100). Alternatively, the quantity may depend on the rankings as well as the amount of display screen real estate available. In other implementations, the quantity may be determined by the reinforcement learning model 212. In some implementations, a shape of the representations of the personalized contents 102 is predefined. In some implementations, the shapes of the personalized contents 102 may be determined by the reinforcement learning model 212. For example, the shapes can be a square, rectangle, circle, oval, irregular (e.g., silhouette of character and/or symbol associated with content), and/or the like. The shapes may be homogeneous, heterogeneous, or a combination. In some implementations, the reinforcement learning model 212 may determine whether the shapes are homogeneous or heterogeneous. In some implementations, the sizes of the personalized contents 102 may be predefined. In some implementations, the sizes can be dynamically determined by the reinforcement learning model 212.

In some implementations, the personalized contents 102 may be selected based upon time, for example, the time of the day, the day of the week, the month of the year, a season, a holiday, etc. In some implementations, the personalized contents 102 can include a sequence of contents based on previous clicks (e.g., historical user action information).

In some implementations, the personalized contents 102 may include interactions, that is, personalized characterization of content (e.g., artwork and/or text). In some implementations, the reinforcement learning model 212 can select a first interaction (e.g., an animation representation of an associated content) for one or more higher ranked contents, a second interaction for one or more lower ranked contents (e.g., an image representation of an associated content), and/or a third interaction for one or more lowest ranked contents (e.g., textual title or description representation of an associated content). For example, the racing game 102(1) may be displayed as an animation video that demonstrates the associated racing video game being played, the basketball game 102(4) may be a still image, and the bonus 102(9) may be a textual symbol of a dollar sign.

In response to the personalized contents 102 being presented, the user 202 may perform one or more user actions 214, which may be received by the content personalization system 200. There may be a myriad of possible user actions 214 that may be performed by the user 202 and received by the content personalization system 200. For example, user actions 214 can include viewing content, selecting content, clicking on content or any other item on the display screen, purchasing, downloading, spending money, spending credits, commenting, sharing, hovering a pointer over content, playing, socializing, failing to select any of the personalized contents 102 (e.g., within a predefined period of time), closing the GUI 100, minimizing, idling, exiting the platform (e.g., a game store), etc.

The content personalization system 200 may include the reward calculator 216 that can calculate a reward value for the user action 214. The reward value may be modeled by the reward calculator 216 and then provided as feedback to the content recommender 210 regarding its selection of the personalized contents 102. That is, the reward calculator 216 may generate a reward vector (including, e.g., the reward value, the user action 214, the user 202, etc.) and provide the reward vector to the content recommender 210. Thereby, the content recommender 210 can adapt the reinforcement learning model 212 based, at least in part, upon the calculated reward value. By adapting the reinforcement learning model 212, business goals targeted by the reward calculator 216 can be better achieved. That is, the reward calculator may be designed to increase the future occurrences of certain actions by the user 202 that are likely to help achieve the business goals.

In some implementations, the reinforcement learning model 212 can learn to better identify the personalized contents 102 that have the highest optimal matching for the user 202 through the reward calculator 216. When the user 202, for example, clicks on a content, the reward calculator 216 may assign a reward value to the click, and thus the reinforcement learning model 212 can learn that the selection of the content is well received or not well received by the user 202. The reinforcement learning model 212 can then adjust the reinforcement learning algorithm to improve future selections of the personalized contents 102 for the user 202 or for other users based on machine learning. The signal that informs the reinforcement learning model 212 whether a particular content was a good recommendation or not may be the reward value calculated by the reward calculator 216. The reward calculator 216 may use one or more reward formulas, which are described in detail below, to calculate reward values associated with user actions 214.

Figure 3A:
FIG. 3A illustrates example business goals, consistent with the present concepts.

Consistent with the present concepts, the reward calculator 216 may be flexible and configurable to adapt to specific business goals and requirements. FIG. 3A illustrates a conceptual diagram of example business goals. For example, a business entity's goals may include one or more of maximizing game purchases (e.g., sales revenue), promoting post-sale monetization (e.g., add-ons, in-game purchases, etc.), decreasing toxicity (e.g., foul language, violence, etc.), increasing engagement (e.g., the number of active players, the number of hours viewed or played, the number of words in comments, the number of social connections created, geographical span of the player base, etc.), providing safety (e.g., protection against cybercriminals, protecting privacy, providing children-appropriate content, etc.), and promoting inclusiveness (e.g., diverse users, diverse game characters, geographical diversity, etc.). These are mere examples, not a complete list of possible business goals. Entities may have other goals that can be achieved through the content personalization system 200.

Figure 3B:
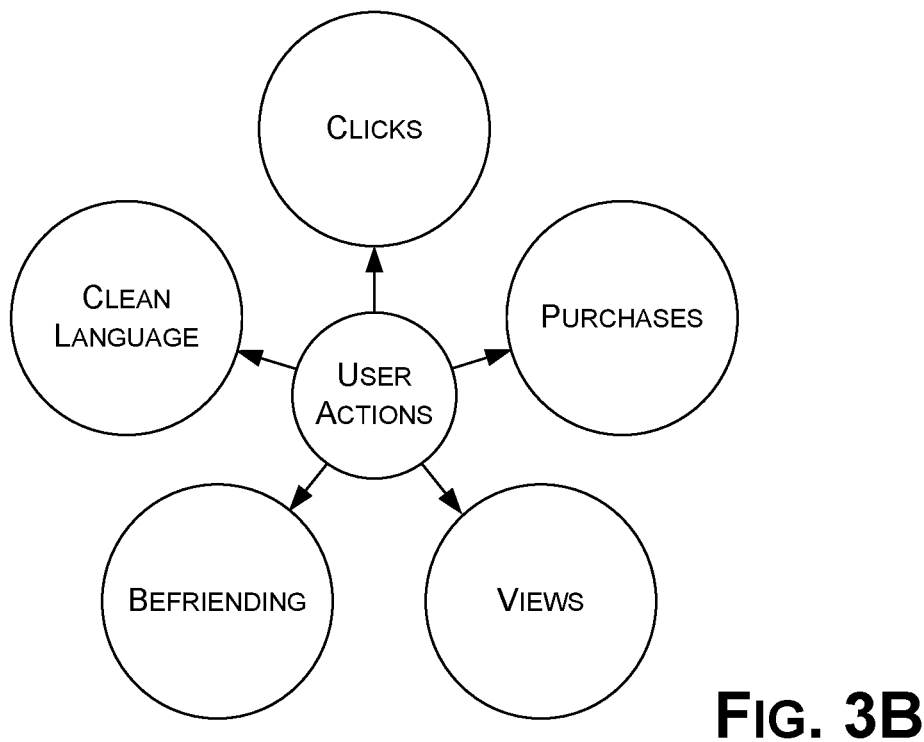
FIG. 3B illustrates example user actions, consistent with the present concepts.

FIG. 3B illustrates a conceptual diagram of example user actions 214. For example, user actions 214 may include, for example, clicking (e.g., clicking on content to view, download, buy, or play), purchasing, viewing, befriending (e.g., sending a friend request, linking, subscribing, inviting a friend to view or play, or any other social connecting), and using clean language. These are mere examples, not a complete list of possible user actions. The user 202 may perform other user actions 214 that can be received by the content personalization system 200, assigned reward values, and used to further train the reinforcement learning model 212 to cause the content recommender 210 to better select personalized contents 102 that would further cause the user 202 or other users to perform more of the desired user actions 214.

Certain business goals may correspond to certain user actions. For example, promoting base game purchases may correspond to encouraging clicks; promoting post-sale monetization may correspond to encouraging purchases; promoting engagement may correspond to encouraging views or playing time; promoting inclusiveness may correspond to encouraging invitations, be-friending, connecting, follow other users, creating groups, joining groups, etc.; promoting safety may correspond to encouraging the use of family-friendly language; and so on. Another way to view the relationship between business goals and user actions is that user actions may have a causal relationship with business goals. For example, increasing the number of clicks on content may increase the possibility of raising game purchases, post-sale monetization, and/or engagement. Increased purchasing by users may increase game purchases, post-sale monetization, and/or engagement. Increased views may increase the possibility of raising game purchases, post-sale monetization, and/or engagement. Increased befriending may increase game purchases (via the tendency of users to buy the same games as their friends have), post-sale monetization, engagement, and/or inclusiveness. The use of clean language may promote higher engagement, safety, and/or inclusivity while decreasing toxicity.

Accordingly, the reward calculator 216 can be specifically configured such that the content recommender 210 recommends personalized contents 102 that encourage or maximize specific user actions 214 and thereby promote targeted business goals.

The reward calculator 216 may use a reward function to calculate a reward value in association with a user action 214, and then feed the reward value to the reinforcement learning model 212. Accordingly, the content recommender 210 may learn, based on the reward values, which selections of personalized contents 102 should be recommended in the future. The reward function can be tailored to assign reward values in a way that the business entity wants the content personalization system 200 to evolve to achieve its business goals.

Consistent with the present concepts, the reward calculator 216 may receive information regarding the user action 214 (e.g., information about the user 202, information about the selected content, etc.) or failure to perform a user action. The reward calculator 216 may calculate a reward value based, at least in part, upon a reward function, the received user action 214, the selected content, and/or the particular user 202. The reward value may be a score indicative of the success of personalization, that is, how well the personalization choice resulted (e.g., as evaluated by the reward calculator 216). For example, the reward value may range from 0 to 1 (0 indicating negative feedback and 1 indicating positive feedback), from −1 to 1 (−1 indicating negative feedback and 1 indicating positive feedback), or any other range of values.

The reward calculator 216 can implement one or more reward drivers (e.g., business goals). For example, the reward calculator 216 may drive business goals illustrated in FIG. 3A or any other goals, including, for example, promoting (1) users clicking the content; (2) the contents that provide engagement; (3) post-sale monetization; (4) the reward of purchase of base games; (5) long-term engagement; and/or (6) purchase amount based on user propensity to buy and tenure effects.

The reward calculator 216 may be very versatile, flexible, dynamic, and adaptable. The reward function can account for a variety of factors pertaining to the content and drive various business goals. In some implementations, the reward value assigned to a user action 214 in connection with a particular content can be based on how much revenue the content has made, how much engagement it has driven, and/or how safe (e.g., family friendly) the content is. Furthermore, the reward function can give weightage to whether the content is toxic.

Using the present concepts, the reward calculator 216 may thus assess the business value of particular contents and allow the content recommender 210 to promote specific contents based on their business values. The characterization of contents (e.g., games, titles, add-ons, bundles, and collections) using a data-driven framework for different specific attributes (e.g., revenue stickiness potential, continuous engagement of the users, safety, and/or novelty) can thus be utilized to recommend the personalized contents 102 to the user 202.

In some implementations, past data from game revenues, add-on purchases, and/or general utility of engagement can be used and balanced based on the temporal aspects (e.g., higher weightage to the engagement goal during off season, higher weightage to the revenue goal during holiday seasons, and so on) as well as business needs (e.g., revenue targets to be achieved, monthly average users (MAU) to be increased). This data can together be used to build heuristics and/or machine learning (ML) models to derive how much value is given to each click in the gaming ecosystem. Hence, when the user 202 clicks on a content, the reward value may be an indicator on a multivalued scale (rather than a binary indicator of good or bad recommendation) of how well the predefined business goals are being promoted.

Rewarding may be a mathematical modeling problem. The reward function can be very flexible, and designing the reward function can be a creative process. A designer can come up with any formula to reward various user actions and decide how much to reward certain user actions. The designer may start with business goal definitions (e.g., the business goals illustrated in FIG. 3A), consider which user actions (e.g., the user actions illustrated in FIG. 3B) promote those business goals, and then model the reward function to connect certain user actions to the business goals. Therefore, the reward function may act as a tool for the business entity to promote certain user behavior.

Consistent with the present concepts, the reward function may account for more than just the question of whether the user 202 clicked or did not click on a particular content. That is, the reward function may consider multiple dimensions or factors, such as did the user continue playing the game, did the user make a purchase, did the user download, did the user enjoy the content, was the content safe, was the content inclusive (i.e., the diversity or spread of consumer groups, e.g., gender, age, race, language, geographical location, etc.), and more.

Accordingly, the reward function can be designed to value a user click based on the particular goals the business entity wants to drive. For example, the reward function can be set to maximize monetization over other considerations. Or, the reward function can be designed to promote long-term engagement at the sacrifice of short-term monetization. The reward function allows flexibility for business entities to promote various dimensions (e.g., base game purchases, post-sale monetization, or engagement) according to their preferred business goals. Business entities can drive content personalization in the areas that further their specific goal targets.

Consistent with the present concepts, the reward calculator 216 may aim to estimate the monetary value to the business entity for each user action (e.g., a click on a particular content). Conceptually, user actions 214 may be categorized into three time-based monetization reward groups: (1) short-term monetization rewards, (2) medium-term monetization rewards, and (3) long-term monetization rewards. For short-term monetization rewards, when a user clicks on content, there is a certain probability that the click will result in purchases of the content to generate revenue. The reward calculator 216 can estimate the dollar value of the content (e.g., a game), which may not necessarily be the sticker price of the game because users often use coupons, discounts, or promotions to purchase the content. For medium-term monetization rewards, when a user purchases a game, there is a certain probability that a post-sale monetization purchase will occur (e.g., an add-on, in-game purchases, or another game). The reward calculator 216 can estimate the post-sale monetization dollar value. For long-term monetization rewards, the reward calculator 216 can estimate the probability and the monetization value of the expected long-term continued engagement with the game. A reward function may calculate the total reward as the sum of the short, medium and long-term rewards. These reward factors may represent the value of the user's click to the business entity. Accordingly, the reward function need not treat all clicks equally but rather reward highly certain clicks that are more likely to lead to monetization for the business entity.

Specific example reward functions will be presented below for illustration purposes. The present concepts are not limited by the example formulas provided below. Rather, the reward function is very flexible and can be designed in any way to reward high or low certain user actions depending on the entity's business goals.

In some implementations, an example reward function may have three dimensions: title, user, and action. Thus, the reward function can be mathematically represented as:

$$r_{t_i} = f(t_i, x_k, a_i) \quad \text{(Equation 1)}$$

where $r_{t_i}$ is the reward value, $a_i$ is the user action (e.g., a click) on the i-th title $t_i$ (e.g., a game title) by the k-th user $x_k$, (e.g., the user 202 based on a user identifier).

The reward function may be defined to promote certain business goals. In some implementations, the dependency of a reward on a particular user (e.g., user identifier) may or may not be taken into consideration, i.e., only the clicks are considered as the user action. A reward function $f(t_i)$ can be defined and adapted, such that the sum of the rewards is maximized by subsequent actions (e.g., clicks) within the reinforcement learning paradigm. Hence, the reward function $f(t_i)$ can be aligned with the business goals and the preferred user behavior.

In some implementations, a greedy reward formula (e.g., R1) may be employed to target monetization goals. In other implementations, a balanced reward formula (e.g., R2) may be employed to promote engagement.

$$R1 = \alpha = p1 \times (E(GSP_{t_i}) + p2 \times E[PSM_{t_i}]) \quad \text{(Equation 2)}$$

$$R2 = f(t_i) = \alpha(1 + \delta(u_i/\overline{u}_i)) \quad \text{(Equation 3)}$$

$E(GSP_{t_i})$: The expected game sale price (GSP) of a title for a click.

$E[PSM_{t_i}]$: The expected add-on purchase of a title for a click (i.e., post-sale monetization (PSM)).

p1: The probability of an action (e.g., a click) to convert to purchase.

p2: The probability of an action (e.g., click) to convert to post-sale monetization.

$u_i$: The utility of content engagement (e.g., title engagement).

$\overline{u}_i$: The average utility of content engagement for all titles in the portfolio of available content.

δ: A tuning parameter to characterize engagement influence.

The terms $E(GSP_{t_i})$ and $E[PSM_{t_i}]$ can constitute price models. The probabilities p1 and p2 can constitute purchase models. And, the variables $u_i$ and δ can constitute engagement models.

Price models may aim to estimate the individual value that each click on a title brings to an entity. Price models can include a GSP model and/or a PSM model. A GSP model for each title can estimate, for example, the expected monthly base price for each title and can vary based on offers, discounts, promotions, etc. A PSM model can estimate the expected monthly PSM revenue per title and can vary based on usage, random latent factors, etc. These and other price models can assist an entity to characterize how a title monetizes, e.g., on a monthly basis, through base game title purchases, add-ons, and/or in-game purchases.

The game sale price (GSP), through, for example, non-subscription revenue, may be the base game purchase price paid by a user. In some implementations, for each title, a distribution of GSP may be observed due to users (e.g., based on user identifiers) paying different amounts (e.g., using token redemption, retail discounts, or other offers). The GSP value can hence be a distribution that can be modeled via the mean and utilized by the reward calculator 216 to calculate reward values.

In some implementations, for each title, a distribution of PSM may be observed due to different usage patterns. The PSM value can hence be a distribution, modeled via the mean and utilized by the reward calculator 216 to calculate reward values.

Purchase models may aim to characterize the purchase behavior of particular users (e.g., based on user identifiers) on a title. Purchase models can include base purchase models and/or add-on or in-game purchase models. A base purchase model may characterize an expectation or probability (i.e., how often) a user action (e.g., a click) converts into a base game purchase. An add-on or in-game purchase model may characterize how likely (or how often), after the base game purchase, an active user (e.g., based on the user identifier) will contribute to PSM. These models and associated probabilities can vary over time due to changing interests of the user, title fatigue, and/or other latent factors.

In one example implementation, the purchase probability p1 can be calculated as:

$$p1 = \frac{\Sigma \text{ Purchases of } t_i}{\Sigma \text{ Clicks on } t_i} \quad \text{(Equation 4)}$$

In another example implementation, the purchase probability p1 can be calculated as:

$$p1 = \frac{\Sigma \text{ Users who paid for } GSP \text{ for } t_i}{\Sigma MAU} \quad \text{(Equation 5)}$$

where MAU is monthly average users.

In some example implementations, the purchase probability p2 can be calculated as:

$$p2 = \frac{\Sigma \, PSM \text{ purchases of } t_i}{\Sigma \text{ Total active users on } t_i} \quad \text{(Equation 6)}$$

Engagement models may use the utility of engagement of a title to characterize its capacity to keep the users on the ecosystem for longer duration and higher frequency. For example, the $u_i$ utility of engagement may be a logarithm function of the number of hours spent on the game title.

In some implementations, engagement models may compare the title's engagement capacity with the average engagement of all available titles. For example, the comparison term $u_i/\bar{u}_i$ (i.e., the relative engagement) may be the engagement capacity of a title compared to the average engagement of all available titles. If the engagement of a title is better than the average, then the reward can be high. If the engagement of a title is lower than the average, then the reward may be low. Accordingly, in this example reward function, if the engagement of a title is close to zero, then the reward function may only reward the monetization and not the engagement. Other formula models are possible. For example, the utility engagement $u_i$ may be compared with the maximum utility of all available contents, rather than the average or the mean. These example reward functions, therefore, may allow different titles to compete with one another for engagement.

The engagement models may reward the value that an engagement brings to the ecosystem (e.g., its capacity to act as a prelude to other titles). In some implementations, an engagement can contribute to the reward value as a partial factor and these models can be tuned with a tuning parameter ($\delta$) for weighing monetization with engagement. For example, the turning parameter may range between 0-100%.

In some implementations, the reward function can be defined to reward user engagement (e.g., clicks). In some implementations, the reward function can be defined to reward monetization (e.g., short term revenue, sticky dollars, and/or post-sale monetization). The example reward formulas shown above may account for rewarding monetization based on pries and/or rewarding engagement, where the user action is a click and the reward value is a function of title. However, other reward functions may be designed to reward other business goals. In some implementations, the reward function can be defined to reward the quality of engagement (e.g., hours played, diversity of games, certain specific genres, etc.). For example, the total worth of a click can be adjusted by relative engagement. In some implementations, the reward function can be defined to reward security. In some implementations, the reward function can be defined to reward a combination (e.g., a weighted combination) of user engagement, monetization, quality of engagement, and/or security. Accordingly, the business entity can design and custom-tailor the reward function to target specific business goals and to adjust the weights given to specific business goals.

The reward formula may include multiple terms for multiple factors to target multiple business goals. Each term may have a tuning parameter as a weight for the specific business goal. For example, a tuning parameter for engagement can be 95% and the tuning parameter for monetization can be 5% if the business entity's objective is to heavily emphasize engagement over monetization. Additional parameters can be added to the reward formula, for example, a tuning parameter of 5% for toxicity, another tuning parameter of 70% for monetization, and another of 25% for engagement.

For example, the greedy reward formula R1 above can be modified to include an additional term of a comparison between the inclusivity score of the title with the average inclusivity score of all titles with $\delta_2$ as the tuning parameter for the additional term. Then, higher rewards can be awarded to titles that are more inclusive, and lower rewards awarded to titles that are less inclusive.

Content features, such as inclusiveness, safety, toxicity, etc., need not be static but can change over time. For example, a toxicity score for a game may change depending on chat messages by users playing the game. A natural language processor can measure the toxicity level of the game based on chat history. For instance, the higher number of abusive words can result in a higher toxicity score for the game. Thus, depending on the language used by the current and recent users of the game, the toxicity level of the game can change over time. The reward function can, for example, include an additional term that compares the toxicity score of the clicked game with the average toxicity of all available games. Toxicity of contents can be inversely rewarded using a fraction (e.g., the average toxicity of all games in the numerator and the toxicity score of the particular game in the denominator) or any other mathematical formula that results in higher reward value for lower toxicity scores.

Accordingly, the reward formula can weigh and balance one or more targeted business goals, such as engagement (e.g., the number of gamers or the number of hours played), monetization (e.g., base purchases or add-ons and in-game purchases), toxicity, inclusiveness, safety, etc. The adjustable tuning parameters in the reward formula can be changed to weigh certain dimensions more than others. Thus, the reward formula can adapt to the changing needs of the business entity.

Tuning parameters can be set manually, or a machine learning model can set and adjust the tuning parameters. For example, a machine learning model can automatically adjust or update the tuning parameters during holiday seasons to drive more engagement over other factors, such as monetization, and then revert back to driving more monetization over engagement after the holiday seasons. For instance, the gaming industry can be highly seasonal. The reward function can be manually configured to give more weight to engagement during holiday seasons, or machine learning can be employed to learn which dimensions should be weighed more based on the time of the year. Not all factors in the reward formula need an adjustable tuning parameter. Some factors in the reward formula may be more static.

Consistent with the present concepts, the reward calculator 216 may be data-driven and may be adaptable to the type of content and any industry to further business goals. Moreover, the reward calculator 216 is not limited to rewarding just clicks. The reward calculator 216 can calculate reward values that can be assigned to any action, such as purchasing, amount of time playing, joining groups, liking a publisher, subscribing, voting, chatting using family-friend language, leaving positive feedback or review ratings, etc. For example, if a user says or types, "This game is awesome," then a high reward value can be assigned to such user action to boost future recommendation of the game.

In one implementation, reward characteristics (e.g., data used by the reward formula) can be computed, for example, using the past 30 days of historical data. For instance, the expected game sale price (GSP) $E(GSP_{t,j})$, the expected add-on purchase $E[PSM_{t,j}]$, the probability of an action converting to purchase p1, the probability of an action converting to post-sale monetization p2, the utility of content engagement $u_j$, and/or the average utility of all available content $\bar{u}_j$ may be calculated based on historical data from the past 30 day. Other time periods, such as one day, one week, a quarter, a year, etc., are possible as well. Therefore, the total reward value for a content can be updated based on recent trends every day or any other desired frequency.

As demonstrated above, the reward function may be flexible and can vary widely depending on design and purpose. The reward function may assign higher reward values to certain game titles while assigning lower rewards to certain other game titles, depending on how those games affect business goals, such as monetization, engagement, inclusivity, safety, etc. Therefore, business entities can purposefully drive and steer user experience by giving more reward to certain actions or behavior, which are more likely to achieve the business goals.

In some scenarios, a business entity's goals and objectives can change. For example, a startup gaming company may want to emphasize engagement at the beginning to grow its user base but later, the company may decide to begin emphasizing monetization more to generate revenue. The reward function may be adapted to the changing business goals. In some implementations, a graphical user interface may allow a user associated with the business entity to adjust the reward function to address the dynamic business goals. For instance, the weights (i.e., the tuning parameters) assigned to one or more elements of the reward function (e.g., R1 and R2 in Equations 2 and 3, respectively) can be modified using a graphical user interface. Also, as explained above, the tuning parameters may be changed automatically using machine learning to adapt to changing business goals, for example, to account for different seasons.

In some implementations, the reward function may adapt to trends based on historical data regarding user actions. For example, historical data regarding user clicks may be available right away to the reward calculator 216. Historical data regarding content purchases may take a few days to be received from financial institutions. Historical data regarding the toxicity metrics for titles may be monitored continuously or periodically by machine learning models that detect slangs, foul language, abusive words, etc. For example, a new game may start out having a low toxicity level (e.g., 1 on a scale of 1 to 10), but as users of the game speak or comment using toxic language more frequently, the toxicity rating for the game may rise to 10 over time. These trends can affect the reward function and thus the reward values associated with the user actions. Such updated metrics for the contents can be fed from the reward calculator 216 to the feature generator 204 and/or the content recommender 210.

For illustration, when the user 202 clicks on a selected content among the plurality of personalized contents 102, the reward calculator 216 can look back at the last 2,000 clicks on the selected content, the overall distribution of engagement for the selected content, the distribution of users who actually made a purchase after the clicks, the monetary value of the purchased items, and so forth. Therefore, the variables in the reward formula can be updated with recent data. For example, the average value of a game having a sticker price of $100 in the last two months may be $50 but the average value of the same game in the past one month may be only $20 if a lot more users used coupons and promotions to buy the game in the past month more so than in the preceding month. Therefore, the reward calculator 216 may update the expected monetization from the game, thus adapting the reward value assigned to a click on that game. As another example, when a new game pack for a game title is released, the game may experience a sudden rise in engagement. The surge in the game engagement can cause the reward calculator 216 to adapt by rewarding the new game pack and/or the game more so than before, thus driving more users to play the game (i.e., further promote and increase engagement). As such, the computation of the reward value for user actions may not be static but dynamic. Also, because the historical data is up-to-date (i.e., "fresh"), the computation of reward values may be driven by recent trends.

Moreover, consistent with the present concepts, the reward calculator 216 may be a function of specific users. For example, an action (e.g., a click) by a high-value user can be assigned a higher reward, because a click from a high value user is more valuable to the business entity (or more valuable to specific business goals) compared to the same action by a low-value user (e.g., who has a low probability of converting clicks to purchases). In some implementations, the reward calculator 216 may weigh engagement more for new gamers, and weight monetization more for gamers with high purchase potential.

Figure 4:
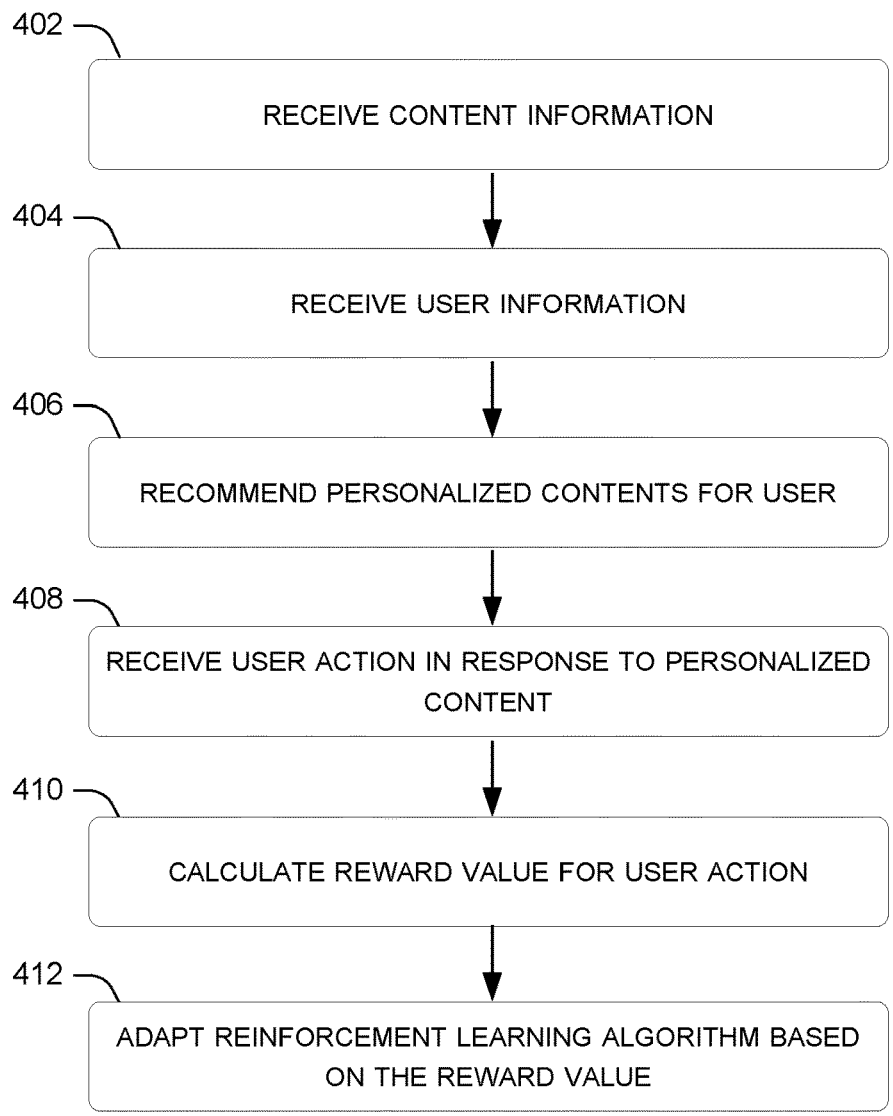
FIG. 4 illustrates an example content personalization method, consistent with the present concepts.

FIG. 4 illustrates an example content personalization method 400, consistent with the present concepts. While the methods (including the content personalization method 400) are shown and described as being a series of acts, the methods are not limited to the specific example order of the sequence. For example, some acts can occur in a different order than what is described herein. In addition, an act can occur concurrently with another act. Further, in some instances, not all acts may be required to implement a method described herein.

Moreover, the acts described herein may be computer-executable instructions stored on a computer-readable medium that can be implemented by one or more processors. The computer-executable instructions can include a routine, a sub-routine, programs, a thread of execution, and/or the like. Still further, results of the acts of the methods can be stored in a computer-readable medium, displayed on a display device, and/or the like. In some implementations, the content personalization method 400 may be performed by the content personalization system 200 or any other system capable of executing instructions.

In act 402, information about available contents may be received. Example types of contents and example types of information about contents are explained above. In some implementations, content vectors may be generated for each content.

In act 404, information about a user may be received. Example types of information about a user are explained above. In some implementations, a user vector may be generated for the user.

In act 406, a set of personalized contents for the user may be recommended. For example, a machine learning model may use a reinforcement learning algorithm to match the user with a top set of personalized contents from all available contents received in act 402. In some implementations, the personalized contents may include a ranking and be displayed to the user according to the ranking.

In act 408, a user action may be received in response to the personalized contents being presented to the user. For example, the personalized contents recommended in act 406 may be presented to the user using a GUI on a display screen. In response, the user may perform a user action, such as clicking on a particular content. Information about the user action may be received in act 408.

In act 410, a reward value may be calculated for the user action. For example, a reward function may be used to calculate a reward value. The reward function can be based on the user action, the selected content, and/or the user. As explained above, the reward function may be designed to target specific business goals, and thus reward highly the types of user actions that are more likely to achieve the targeted business goals.

In act 412, the reinforcement learning algorithm may be adapted based the reward value calculated in act 410 for the user action received in act 408. The reinforcement learning algorithm may adapt according to whether the reward value is positive or negative feedback of the personalized contents that were recommended to the user in act 406. Such feedback, i.e., reinforcement, may allow the reinforcement learning algorithm to improve its selection of personalized contents in the future to further the business goals targeted by the reward function.

Figure 5:
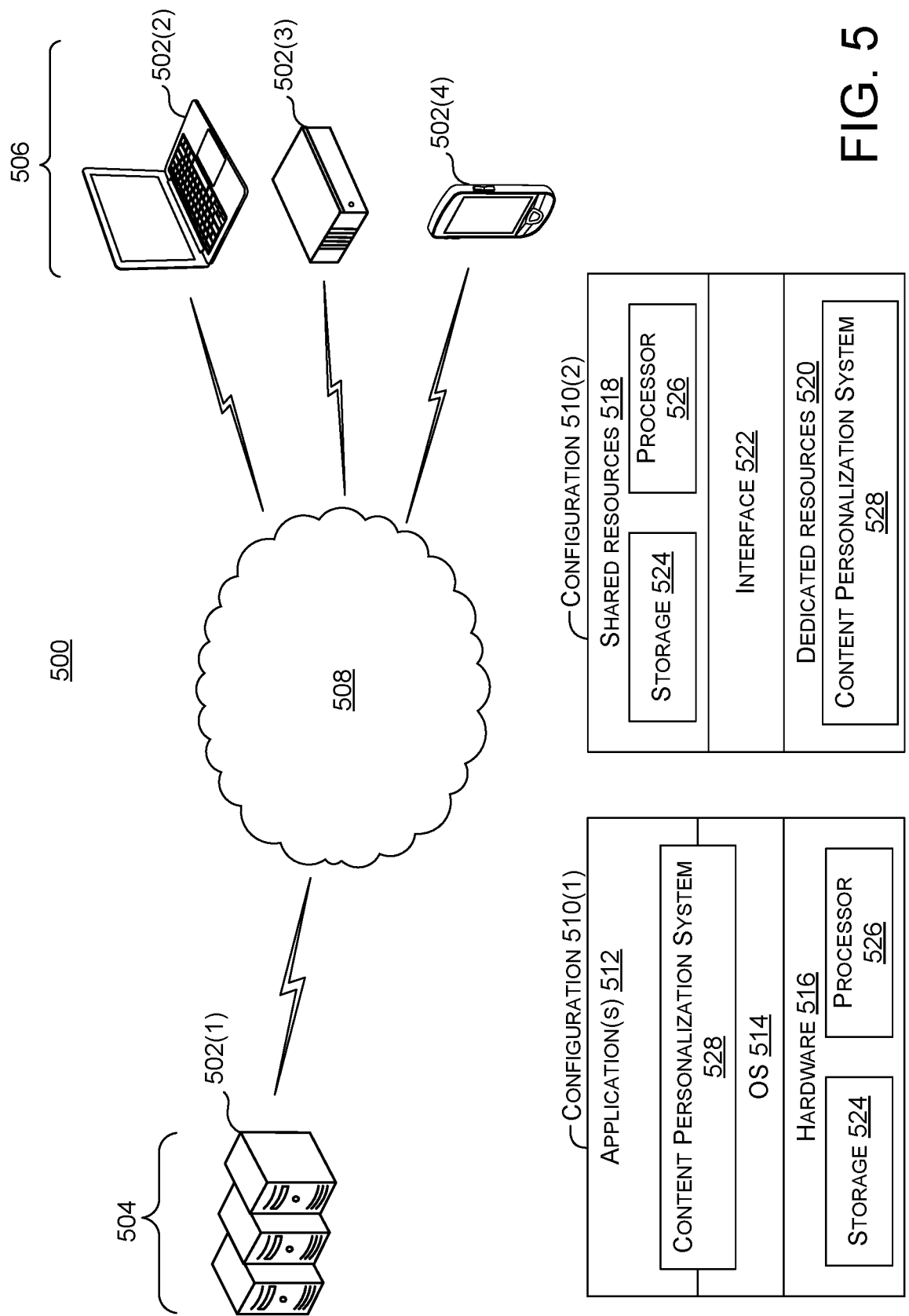
FIG. 5 illustrates an example content personalization environment, consistent with the present concepts.

FIG. 5 illustrates an example content personalization environment 500, in which some implementations of the present concepts may be used. For purposes of explanation, the example content personalization environment 500 may include devices 502. Examples of devices 502 can include traditional computing devices, such as personal computers, desktop computers, servers, notebook computers, cellular phones, smartphones, personal digital assistants, pad type computers, mobile computers, cameras, appliances, virtual reality headsets, video game consoles, controllers, smart devices, IoT devices, vehicles, watches, wearables, set-top boxes, game systems, etc., and/or any of a myriad of ever-evolving or yet to be developed types of electronic devices.

In the example shown in FIG. 5, the devices 502 may include a server device 502(1) (or a collection of servers), a laptop 502(2), a video game console 502(3), and a smartphone 502(4). For purposes of explanation, device 502(1) can be viewed as being a server-side device 504 (or cloud-based resource), and devices 502(2)-502(4) can be viewed as being client-side devices 506 (or client devices). The number of devices and the client-versus-server side of the devices described and depicted are intended to be illustrative and non-limiting. The devices 502 can communicate with one another via one or more networks 508 and/or can access the Internet over the one or more networks 508.

The term "device," "computer," or "computing device" as used herein can mean any type of device that has some amount of processing capability and/or storage capability. Processing capability can be provided by one or more hardware processors that can execute data in the form of computer-readable instructions to provide a functionality. Data, such as computer-readable instructions and/or user-related data, can be stored on storage, such as storage that can be internal or external to the device. The storage can include any one or more of volatile or non-volatile memory, hard drives, flash storage devices, optical storage devices (e.g., CDs, DVDs etc.), and/or remote storage (e.g., cloud-based storage), among others. As used herein, the term "computer-readable media" can include transitory propagating signals. In contrast, the term "computer-readable storage media" excludes transitory propagating signals. Computer-readable storage media may include computer-readable storage devices. Examples of computer-readable storage devices may include volatile storage media, such as RAM, and non-volatile storage media, such as hard drives, optical discs, and flash memory, among others.

In some implementations, the server-side device 504, the client-side devices 506, and/or a combination may perform all or parts of the content personalization method 400. For example, the server-side device 504 may recommend personalized contents, calculate reward values, and implement the reward function and/or reinforcement learning algorithm. As another example, the client-side devices 506 may present personalized contents to users and/or receive user actions from users.

FIG. 5 shows two example device configurations 510(1) and 510(2) that can be employed by any or all of the devices 502. Individual devices 502 can employ either of the configurations 510(1) or 510(2), or an alternate configuration. One instance of each configuration 510 is illustrated in FIG. 5. Briefly, device configuration 510(1) may represent an operating system (OS) centric configuration. Configuration 510(2) may represent a system on a chip (SOC) configuration. Configuration 510(1) can be organized into one or more applications 512, operating system 514, and hardware 516. Configuration 510(2) may be organized into shared resources 518, dedicated resources 520, and an interface 522 there between.

In either configuration 510, the device 502 can include a storage 524 and a processor 526. The device 502 can also include a content personalization system 528. For instance, the content personalization system 528 may be the content personalization system 200 described above or a similar system.

As mentioned above, configuration 510(2) can be thought of as a system on a chip (SOC) type design. In such a case, functionality provided by the device can be integrated on a single SOC or multiple coupled SOCs. One or more processors 526 can be configured to coordinate with shared resources 518, such as storage 524, etc., and/or one or more dedicated resources 520, such as hardware blocks configured to perform certain specific functionality. Thus, the term "processor" as used herein can also refer to central processing units (CPUs), graphical processing units (GPUs), controllers, microcontrollers, processor cores, or other types of processing devices.

Generally, any of the functions described herein can be implemented using software, firmware, hardware (e.g., fixed-logic circuitry), or a combination of these implementations. The term "component" as used herein generally represents software, firmware, hardware, whole devices or networks, or a combination thereof. In the case of a software implementation, for instance, these may represent program code that performs specified tasks when executed on a processor (e.g., CPU or CPUs). The program code can be stored in one or more computer-readable memory devices, such as computer-readable storage media. The features and techniques of the component are platform-independent, meaning that they may be implemented on a variety of commercial computing platforms having a variety of processing configurations.

Although many of the example implementations of the present concepts provided above were explained in the context of video games for the purpose of illustration, the present concepts have a wide range of applications and can be applied to virtually any industry. For example, a digital streaming movie provider in the entertainment industry can use the present concepts to further its business goals. For instance, the movie provider may have a library of available contents, including movies, short video clips, DVDs, Blu-ray discs, movie extras (e.g., bonus clips, outtakes, bloopers, gag reels, alternative endings, deleted scenes, interviews, etc.), streaming subscriptions, memorabilia, event tickets, advertisements, etc. The movie provider may set certain business goals, such as short-term revenues from movie purchases, engagement from streaming views, post-sale monetization from movie extras and memorabilia, long-term revenues from subscriptions, advertisement revenues, etc. Accordingly, the movie provider may design reward functions specifically targeting one or more business goals according to desired weights to encourage specific user behavior. User actions that can be encouraged by the movie provider using the reward functions can include, for example, viewing streaming movies, purchasing DVDs, renewing subscriptions, clicking on advertisements, etc. The movie provider may use the present concepts, including reinforcement learning algorithms, to select a personalized set of contents to individual users in order to encourage specific user actions, assign appropriate reward values to those actions that help achieve the business goals of the movie provider, and feed the reward values to the reinforcement learning algorithms to adapt them to provide improved selections of personalized contents in the future. The personalized contents may be presented to the users on TVs, apps, web sites, etc. In one example scenario, the movie provider can manually or automatically adjust the tuning parameters associated with the business goals in the reward functions, for example, to weigh monetization more heavily during holiday seasons when users are more like to spend money, and then weigh engagement more heavily during off-seasons to encourage more engagement-related user actions.

As another example, the present concepts may be employed by a cellular service provider in the communications industry. Available contents may include cellular service plans (e.g., call plans, text plans, data plans, group plans, pre-paid plans, pay-as-you-go plans, etc.), mobile devices (e.g., smartphones, tablets, laptops, watches, modems, hotspot devices), device accessories (e.g., phone cases, tablet covers, power chargers, battery packs, headphones, etc.), add-ons (e.g., device warranties, international plans, additional data allotments, etc.), and contracts (e.g., long-term service plans, device payment plans, etc.). Business goals may include engagement (e.g., the number of customers, data usage, etc.), short-term monetization from device sales, post-sale monetization from the sale of device accessories and service plan add-ons, long-term revenue from subscriptions and contracts, etc. The service provider can design reward functions to target specific business goals and thereby encourage (via higher reward values) certain user actions (e.g., purchasing, talking, texting, browsing, renewing, etc.) that help further those business goals. In one example scenario, the service provider may tailor the reward functions to individual users, such as rewarding higher the selection of certain brand of devices for a user who has a history of clicking on or purchasing that brand of devices, or rewarding higher the selection of accessories for a user who has a history of purchasing relatively high amount of accessories than average users.

Various examples are described above. Although the subject matter has been described in language specific to structural features and/or methodological acts, the subject matter defined in the appended claims is not necessarily limited to the specific features or acts described above. Rather, the specific features and acts described above are presented as example forms of implementing the claims, and other features and acts that would be recognized by one skilled in the art are intended to be within the scope of the claims.

Additional examples are described below. One example includes a computer-readable storage medium storing instructions which, when executed by a hardware processor, cause the hardware processor to: receive content information regarding available contents, receive user information regarding a user, select a set of personalized contents for the user from the available contents using a reinforcement learning model, receive a user action in response to a presentation of the set of personalized contents, calculate a reward value for the user action based on a reward function, and adapt the reinforcement learning model based on the reward value to increase a probability of future occurrences of the user action.

Another example can include any of the above and/or below examples wherein the available contents include games.

Another example can include any of the above and/or below examples where the instructions further cause the hardware processor to: generate content vectors associated with the available contents based on the content information and generate a user vector associated with the user based on the user information, where the set of personalized contents is selected based on the content vectors and the user vector.

Another example can include any of the above and/or below examples where the reinforcement learning model selects the personalized contents that maximize the reward value.

Another example includes a system comprising a hardware processor and storage having instructions which, when executed by the hardware processor, cause the hardware processor to: receive game information regarding available games, receive user information regarding a user, recommend a personalized set of games for the user from the available games using a machine learning model, receive a user action associated with a selected game from the personalized set of games, calculate a reward value for the user action, and train the machine learning model based on the reward value as feedback to improve future recommendations of the available games.

Another example can include any of the above and/or below examples where the machine learning model uses a reinforcement learning algorithm to recommend the personalized set of games.

Another example can include any of the above and/or below examples where the personalized set of games includes ranking.

Another example can include any of the above and/or below examples where the personalized set of games is displayed using heterogenous sizes that depend on the ranking of the personalized set of games.

Another example includes a method comprising receiving user information about a user, recommending personalized contents for the user from available contents by using a reinforcement learning model, receiving an action relating to a selected content from the personalized contents, calculating a reward value for the action by using a reward function, and adapting the reinforcement learning model using the reward value as feedback.

Another example can include any of the above and/or below examples where the reward function is based on the selected content.

Another example can include any of the above and/or below examples where the reward function is based on the available contents.

Another example can include any of the above and/or below examples where the reward function is based on the user.

Another example can include any of the above and/or below examples where the reward function is defined to target goals.

Another example can include any of the above and/or below examples where the goals include one or more of monetization, engagement, inclusiveness, safety, or toxicity.

Another example can include any of the above and/or below examples where the reward function includes one or more tuning parameters for weighing the one or more goals.

Another example can include any of the above and/or below examples where the tuning parameters are automatically adjusted based on time using a machine learning model.

Another example can include any of the above and/or below examples where the reward function is based on a probability of the user who performed the action will perform a subsequent action.

Another example can include any of the above and/or below examples where the subsequent action includes one or more of purchasing the selected content, purchasing another content, or playing the selected content.

Another example can include any of the above and/or below examples where the reward function is based on historical data.

Another example can include any of the above and/or below examples where the reinforcement learning model is adapted to increase an occurrence of the action.

The invention claimed is:

1. A computer-readable storage medium storing instructions which, when executed by a hardware processor, cause the hardware processor to:
   receive content information regarding available contents;
   receive user information regarding a user;
   input content vectors based on the content information and a user vector based on the user information to a reinforcement learning model;
   recommend a set of personalized contents for the user from the available contents, the set of personalized contents being output by the reinforcement learning model;
   receive a user action in response to a presentation of the set of personalized contents to the user;
   train the reinforcement learning model by:
   calculating a reward value for the user action based on a reward function that includes a monetization term and an engagement term, the monetization term including a monetization tuning parameter that is manually set as a weight for targeting a monetization business goal, the engagement term including an engagement tuning parameter that is manually set as a weight for targeting an engagement business goal;
   and adapting the reinforcement learning model using the reward value to increase a probability of future occurrences of the user action that help achieve the monetization business goal and the engagement business goal.

2. The computer-readable storage medium of claim 1, wherein the instructions further cause the hardware processor to: generate the content vectors associated with the available contents based on the content information; and generate the user vector associated with the user based on the user information, wherein the set of personalized contents is selected by the reinforcement learning model based on the content vectors and the user vector.

3. The computer-readable storage medium of claim 1, wherein the reinforcement learning model selects the set of personalized contents that maximize the reward value.

4. The computer-readable storage medium of claim 1, wherein the reinforcement learning model selects the set of personalized contents based at least on randomness.

5. The computer-readable storage medium of claim 1, wherein the reinforcement learning model uses a contextual bandit algorithm to select the set of personalized contents.

6. A system, comprising:
   a hardware processor;
   and storage having instructions which, when executed by the hardware processor, cause the hardware processor to:
   receive game information regarding available games;
   generate game vectors associated with the available games based on the game information;
   receive user information regarding a user;
   generate a user vector associated with the user based on the user information;
   input the game vectors and the user vector to a machine learning model;
   recommend a personalized set of games for the user from the available games, the personalized set of games being output by the machine learning model;
   receive a user action associated with a selected game from the personalized set of games;
   calculate a reward value for the user action using a reward function that includes terms associated with business goals, the terms having tuning parameters that are manually set as weights for targeting the associated business goals;
   and train the machine learning model using the reward value as feedback to improve future recommendations of the available games that promote the business goals.

7. The system of claim 6, wherein the machine learning model uses a reinforcement learning algorithm to select the personalized set of games.

8. The system of claim 6, wherein the personalized set of games includes ranking.

9. The system of claim 8, wherein the personalized set of games is displayed using heterogenous sizes that depend on the ranking of the personalized set of games.

10. The system of claim 8, wherein the personalized set of games is displaying using heterogenous levels of interaction that depends on the ranking of the personalized set of games.

11. A method, comprising:
    receiving user information about a user;
    inputting a user vector based on the user information to a reinforcement learning model;

recommending personalized contents for the user from available contents, the personalized contents being output by the reinforcement learning model;

receiving an action relating to a selected content from the personalized contents;

calculating a reward value for the action by using a reward function that includes terms associated with goals and tuning parameters associated with the terms, the tuning parameters being manually set as weights for targeting the goals;

and training the reinforcement learning model using the reward value as feedback to select future personalized contents that further the goals.

12. The method of claim 11, further comprising:

monitoring content features associated with the available contents including the selected content;

and automatically adjusting the reward function based on a particular monitored content feature associated with the selected content.

13. The method of claim 12, wherein the reward function is based on an average of a particular monitored feature associated with the available contents.

14. The method of claim 11, further comprising:
monitoring user features associated with the user; and
automatically adjusting the reward function based on a particular monitored user feature associated with the user.

15. The method of claim 11, wherein the goals include one or more of monetization, engagement, inclusiveness, safety, or toxicity.

16. The method of claim 11, wherein the tuning parameters are automatically adjusted based on time using a machine learning model.

17. The method of claim 11, wherein the reward function is based on a probability of the user who performed the action will perform a subsequent action.

18. The method of claim 17, wherein the subsequent action includes one or more of purchasing the selected content, purchasing another content, or playing the selected content.

19. The method of claim 11, wherein training the reinforcement learning model includes adapting the reinforcement learning model to increase an occurrence of the action.

20. The method of claim 11, wherein the reward function includes one or more of: an estimated value of the action for a particular content, a probability of the action converting to a particular goal, a utility of the particular goal for the particular content, or an average utility of the particular goal for the available contents.

* * * * *